Patented May 6, 1952

2,596,067

UNITED STATES PATENT OFFICE 2,596,067

PREPARING COOKED CURED MEATS

George E. Brissey, Chicago, Ill., assignor to Swift & Company, Chicago, Ill., a corporation of Illinois No Drawing. Application December 5, 1950, Serial No. 199,350

10 Claims. (Cl. 99—159)

This invention relates to an improved process for preparing cooked cured meats, and particularly to an improved process of preparing cooked quick cured meats.

It has been common commercial practice to cure hams used in preparing "boiled" hams by pumping the hams arterially with a curing solution or "pumping pickle" containing salt, sugar and soluble nitrate and nitrite salts and allowing the pumped hams to stand in "cover pickle" comprising a more dilute solution of curing pickle for about 20 days. Hams cured in the foregoing manner are said to be "quick cured," since the total time required for the hams pumped arterially with the nitrite curing pickle to attain the cured condition is substantially less than was formerly required. The quick cured hams are then washed, boned, preferably smoked, and cooked in suitable forming containers by immersing the said containers in a hot water bath until the hams reach an internal temperature of 152° F. whereupon the containers are chilled and the hams removed from the containers.

Hams processed in the foregoing manner frequently exhibit marked differences in their "out of cook" yield, and two hams having the same weight prior to cooking may differ in weight after cooking by as much as 10 per cent. And, even those hams exhibiting the relatively larger yields after cooking are found to have lost a substantial amount of soluble protein in the cooking water. Hams processed in the foregoing manner also exhibit wide variations in the stability of their characteristic cured appearance. Some cooked quick cured hams will have considerable resistance to the formation of green discoloration while others will rapidly develop an objectionable green discoloration.

It is an object of the present invention to substantially reduce the above-mentioned losses and to overcome the objectionable features encountered heretofore in the preparation of cooked meat products prepared from quick cured meats.

More particularly it is an object of the present invention to provide a process of preparing a cooked quick cured meat product which will increase the "out of cook" yield of quick cured meat products.

Another object of the invention is to provide a process of preparing a cooked quick cured meat product which will make the "out of cook" yield of quick cured meat products larger and more uniform.

Still another object of the present invention is to provide a process of preparing a cooked quick cured meat product having a substantially improved resistance to discoloration.

A still further object of the invention is to provide a process of preparing a cooked quick cured meat product which retains within the said meat an increased amount of soluble protein after being cooked.

Another object of the invention is to provide a process of preparing a cooked quick cured meat product having an improved appearance and flavor.

Other objects of this invention will be apparent from the description and claims to follow.

It has been found that the foregoing and other objects can be achieved by employing a curing preparation in the quick curing process which contains a small amount of disodium phosphate in addition to the usual ingredients of the conventional quick curing preparation.

While the invention is applicable to any quick cured meat product which is cooked prior to serving, it is particularly applicable to hams which are quick cured and cooked during the normal processing thereof. The invention will therefore be described in detail as applied to the preparation of cooked and canned hams.

Cooked hams or so-called "boiled" hams processed in accordance with the present invention are pumped arterially with 8 per cent by weight and intermuscularly with 2 per cent by weight of a pumping pickle containing about 5 per cent disodium phosphate. This pumping pickle preferably comprises on a weight basis 18 per cent sodium chloride, 1 per cent sugar, 0.1 per cent sodium nitrite, 0.1 per cent sodium nitrate, and 4.75 per cent disodium phosphate calculated on the anhydrous basis. The foregoing pumping pickle has about a 90 degree salometer reading but may be strengthened by adding salt or diluted by the addition of water, if desired. The hams pumped as described are placed in a vat and covered with a curing pickle commonly designated as "cover pickle." This cover pickle preferably comprises on a weight basis 15 per cent sodium chloride, 1 per cent sugar, 0.1 per cent sodium nitrite, and 0.1 per cent sodium nitrate, and has a 60° salometer reading, but may be diluted or strengthened as desired. The hams are left in the cover pickle for about 15 days and are preferably turned at the end of the seventh day in the cover pickle. After about 15 days in the cover pickle, the hams are considered fully cured and are washed, boned, preferably smoked, and put into suitable forms and cooked in water at 155° F. until an internal temperature of 152° F. is attained. The hams are chilled and removed from the forms and are ready for sale.

The following table shows the results of plant scale tests with paired hams conducted in accordance with the foregoing procedure for producing "boiled hams," one of each of said paired hams being treated with disodium phosphate containing pickle and the other of each of the said paired hams being cured in the regular manner:

arterially with 9 per cent of a pumping pickle, preferably the same improved curing pickle containing 4.75 per cent anhydrous disodium phosphate as that employed in prepared "boiled hams." The pumped hams are then hand-rubbed with 2 per cent dry sodium chloride so that their entire surface is thoroughly salted. The hams are then stacked in racks and after 4 days are turned and restacked. After a further period of from 2 to 4 days the hams are suitably cured and are washed, boned, placed in a suitable container, vacuum-packed, and sealed. The ham containers are then placed in water at 155° F. until an internal temperature of 152° F. is reached. After cooling, the canned cooked hams are ready for shipment.

The following table shows the results of plant scale tests with paired hams conducted in accordance with the foregoing procedure and in which one of each of the paired hams was treated with curing pickle containing 4.75 per cent by weight of anhydrous disodium phosphate and the other of each of said paired hams was cured in the regular commercial manner:

*Table II*

| Batch Number | No. of Hams | Green Weight | Per cent Pump | Cured Weight | Per cent Gain | Into Can Weight | Out of Can Weight | Wgt. of Jelly | Per cent Yield | Avg. pH |
|---|---|---|---|---|---|---|---|---|---|---|
| | | lbs. | | lbs. | | lbs. | lbs. | lbs. | | |
| 1-Treated | 39 | 498 | 9.0 | 539 | 108.2 | 466 | 416 | 50 | 89.2 | 6.39 |
| 1A-Regular | 39 | 504 | 9.1 | 545 | 108.1 | 472 | 400 | 72 | 84.7 | 6.15 |

It is evident from the foregoing data in Table II that the yield of the treated hams is 4.5 per cent greater than the yield of the regular hams which were not treated in accordance with the present invention. It will also be evident from

*Table I*

| Batch Number | No. of Hams | Green Weight | Percent Pump | Cured Weight | Percent Gain | Into Cook Weight | Out of Cook Weight | Percent Yield | Average pH |
|---|---|---|---|---|---|---|---|---|---|
| | | lbs. | | lbs. | | lbs. | lbs. | | |
| 1-Treated | 50 | 783 | 9.8 | 881 | 112.5 | 650 | 568 | 87.4 | 6.38 |
| 1A-Regular | 50 | 785 | 9.1 | 881 | 112.2 | 656 | 555 | 84.6 | 6.12 |
| 2-Treated | 49 | 757 | 9.5 | 855 | 113.0 | 614 | 568 | 92.6 | 6.44 |
| 2A-Regular | 49 | 751 | 9.5 | 841 | 112.1 | 616 | 540 | 87.7 | 6.07 |

It will be evident from the foregoing data in Table I that the "out of cook" weight of the hams treated in accordance with the present invention is substantially larger than the weight of the control hams treated in the conventional manner.

It will also be evident that the yield for the treated hams in test No. 1 is 2.8 per cent greater than the yield for the regular hams. In test No. 2 the yield for the treated hams is 4.9 per cent greater than the yield for the regular hams. Appearance tests conducted by an experienced panel of observers in every instance selected the treated hams as having a better cured appearance.

Canned hams when prepared in accordance with the herein-disclosed invention are pumped the data in the foregoing table that there is substantially more jelly produced in the regular canned hams than in the treated canned hams. While the average protein content of the jelly from the regular hams is 3.8 per cent as compared with 4.1 per cent for the treated hams, the treated hams retain substantially more protein than do the regular hams because of the greater quantity of jelly produced by the hams processed in the regular manner.

The following table shows the results of laboratory tests conducted on paired hams processed in accordance with the foregoing procedure, wherein the right ham designated "R" was treated in accordance with the present invention and the left ham designated as "L" was treated in the regular manner:

*Table III*

| Ham No. | Green Weight (Lb. oz.) | Cured Weight (Lb. oz.) | Per cent of Green Weight | Into Can Weight | Out of Can Weight | Per cent Yield | pH |
|---|---|---|---|---|---|---|---|
| 1R | 11–1 | 11–115 | 105.9 | 10–2 | 9–3 | 90.8 | 6.74 |
| 2R | 10–55 | 10–145 | 105.3 | 9–6 | 8–105 | 92.3 | |
| 3R | 8–15 | 9–35 | 103.1 | 7–13 | 7–4 | 92.8 | 6.72 |
| 4R | 10–7 | 11–15 | 106.2 | 9–8 | 8–105 | 91.1 | |
| 5R | 11–11 | 12–45 | 105.1 | 10–12 | 9–115 | 90.3 | |
| 6R | 9–75 | 10–2 | 106.9 | 8–12 | 8–05 | 91.7 | 6.62 |
| 7R | 9–13 | 10–35 | 104.2 | 8–14 | 8–2 | 91.6 | |
| 8R | 11–2 | 11–125 | 105.9 | 10–4 | 9–5 | 90.8 | |
| 9R | 13–4 | 14–0 | 105.9 | 12–1 | 11–05 | 91.4 | 6.72 |
| 10R | 12–15 | 12–145 | 106.8 | 11–2 | 10–45 | 92.4 | 6.57 |
| Avg | | | | | | 91.5 | |
| 1L | 11–6 | 12–3 | 107.1 | 10–7 | 9–1 | 86.8 | 6.37 |
| 2L | 11–1 | 11–13 | 106.8 | 10–3 | 9–05 | 88.6 | |
| 3L | 9–7 | 9–145 | 105.0 | 8–5 | 7–11 | 92.3 | 6.48 |
| 4L | 10–65 | 11–4 | 108.1 | 9–11 | 8–65 | 86.8 | |
| 5L | 11–105 | 12–4 | 105.1 | 10–11 | 9–55 | 87.3 | |
| 6L | 9–9 | 10–3 | 106.6 | 8–13 | 7–105 | 86.8 | 6.32 |
| 7L | 9–14 | 10–95 | 107.2 | 9–0 | 7–155 | 88.5 | |
| 8L | 11–0 | 11–12 | 106.8 | 10–4 | 8–145 | 86.9 | |
| 9L | 13–7 | 14–55 | 106.8 | 12–7 | 10–155 | 88.1 | 6.50 |
| 10L | 11–11 | 12–75 | 106.8 | 10–10 | 9–4 | 87.1 | 6.28 |
| Avg | | | | | | 87.9 | |

In each instance the treated ham exhibits a substantially increased yield over the untreated control ham. Since the paired hams were identical in every respect except in the manner of treating, it is evident that the improved results obtained are the direct result of treating the hams in accordance with the present invention.

Additional tests were conducted in the laboratory on both cooked and canned hams in accordance with the herein-described procedure in which 5 to 10 pairs of hams for each test were used. In each case one of each pair was pumped with disodium phosphate treated pickle so as to obtain about 0.05 per cent by weight dibasic sodium phosphate (disodium phosphate) in the ham, while the other of each pair was pumped with the regular untreated pickle. The following results were obtained:

*Table IV*

| Test | Treated | | | | Regular | | | |
|---|---|---|---|---|---|---|---|---|
| | pH Pumping Pickle | Per cent Curing Gain | Average Yield | Average pH | pH Pumping Pickle | Per cent Curing Gain | Average Yield | Average pH |
| CANNED HAMS | | | | | | | | |
| 1 | 7.31 | 105.6 | 87.8 | 6.31 | 6.09 | 106.6 | 84.5 | 6.12 |
| 2 | 7.32 | 105.5 | 91.5 | 6.66 | 6.10 | 106.6 | 87.9 | 6.39 |
| 3 | 7.11 | 106.1 | 90.3 | 6.54 | 6.82 | 106.7 | 87.1 | 6.21 |
| 4 | 7.33 | 107.1 | 93.2 | 6.68 | 6.14 | 106.7 | 89.4 | 6.35 |
| COOKED HAMS | | | | | | | | |
| 1 | 7.24 | 113.1 | 89.1 | 6.49 | 6.17 | 113.3 | 86.0 | 6.47 |
| 2 | 7.33 | 113.9 | 85.3 | 6.51 | 6.14 | 113.4 | 82.4 | 6.21 |

The data in the foregoing table show that when the pH of the ham is increased by from .2 to .4 units, an increase in "out of cook" yield of approximately 3 per cent, with no appreciable increase in curing gain, is obtained. It is significant that the herein-disclosed process does not appreciably increase the curing gain, as this shows that the treatment in accordance with the herein-disclosed process does not cause the hams to take on an additional amount of water. From this it is evident that the improved result is obtained through the retention of normal cell fluids and protein, not by the taking on of additional fluids from the curing solutions.

The pumping pickle employed in the present invention is preferably prepared by using the cover pickle which has been already used in the curing of cooked hams and passing this cover pickle through a salt bed until about 18 per cent or more salt is dissolved in the pickle. To the salt-fortified pickle is added the necessary amount of disodium phosphate in either the anhydrous or any of the hydrated forms thereof, and the pickle is sterilized or pasteurized in accordance with government regulations. The required amount of nitrate, nitrite, and sugar is then added to the pickle. It is preferred to employ about 6 per cent by weight of the dihydrate of disodium phosphate which is about equivalent to 4.75 per cent by weight of anhydrous disodium phosphate. This concentration of disodium phosphate in the pickle solution approaches the maximum amount (5.25 per cent by weight) which may be used in the pumping pickle and still retain the disodium phosphate in solution within the pumped ham under the processing conditions employed in the art. If larger amounts of disodium phosphate are employed in the pumping pickle, the disodium phosphate crystallizes out of solution within the cured ham. The foregoing amount of disodium phosphate in the pickle produces about 0.5 per cent by weight disodium phosphate in the ham when used in the specified amounts.

A further critical limitation on the amount of disodium phosphate which may be employed is the maximum pH of the meat. It has been found that if the pH of the meat exceeds 6.8, the meat becomes slimy and unacceptable. The proper amount of dibasic sodium phosphate in the curing pickle will generally increase the pH of the curing pickle to between 7.1 and 7.4 which, in turn, increases the pH of the meat between about 0.2 and 0.4 pH units above the normal pH of the meat which generally exhibits a maximum pH of about 6.4. Any larger amounts of disodium phosphate in the pumping pickle which increases the pH of the meat above 6.8 will cause the meat being cured to have the highly objectionable and characteristically slippery alkaline texture. It is therefore considered essential that the disodium phosphate content of the curing pickle be maintained so that the pH of the meat being treated does not exceed a pH of 6.8.

While the foregoing invention has been described in detail as applied to the preparation of cooked or "boiled" hams and canned hams, the invention is also applicable to the standard fully cooked hams. These hams are prepared by pumping arterially with 8 per cent standard pumping pickle containing about 6 per cent of the dihydrate of disodium phosphate, and the hams are then placed in a vat containing the conventional cover pickle for about 15 to 20 days. At the end of the curing period, the hams are soaked in water having a temperature of 80–90° F. for 5 hours, washed, hung in a smoke house for 12 hours at a maximum temperature of 135° F., and are then finally cooked by holding in a high humidity atmosphere having a temperature of 150° F. for a period of 24 hours or until an internal temperature of at least about 148° F. is reached. Hams treated in accordance with the foregoing procedure are found to produce the same improved "out of cook" yield and desirable appearance as the cooked and canned hams described heretofore.

The present invention is also applicable to comminuted cured meat products, in addition to the quick cured ham items described in detail heretofore, wherein the ingredients are quick cured by curing preparations containing nitrite-forming salts.

In addition to the herein-disclosed dibasic alkali phosphate, other salts such as sodium carbonate and sodium bicarbonate and similar weakly alkaline salts can be used in the present invention to achieve certain of the improvements when optimum results are not required. Because these weakly alkaline salts, other than disodium phosphate, cause certain flavor defects in the treated product and are less acceptable when used in accordance with the teachings of the present invention, a dibasic alkali phosphate is the weakly alkaline salt employed. The disodium phosphate salt is considered the most suitable of the foregoing class.

Obviously, many modifications and variations of the invention as hereinbefore set forth may be made without departing from the spirit and scope thereof, and therefore only such limitations should be imposed as are indicated in the appended claims.

I claim:

1. In a process of preparing cooked, cured meat products wherein a fresh meat is quick-cured, the improvement which comprises treating a fresh meat product with a meat-curing preparation containing a small amount of a dialkali phosphate, the amount of said dialkali phosphate calculated on its anhydrous basis not exceeding about 5% by weight of said preparation, to increase the phosphate content of the meat expressed as disodium phosphate by not in excess of about 0.5% based on the weight of the cured meat product, and to measurably raise the pH of the meat without exceeding a pH of 6.8; whereby the cured meat product when cooked retains an increased amount of soluble protein and exhibits a larger cooked yield.

2. In a process of preparing cooked, cured meat products wherein a fresh meat is quick-cured, the improvement which comprises treating a fresh meat product with a meat-curing preparation containing a small amount of disodium phosphate, the amount of said disodium phosphate calculated on its anhydrous basis not exceeding about 5% by weight of said preparation, to increase the phosphate content of the meat expressed as disodium phosphate by not in excess of about 0.5% based on the weight of the cured meat product, and to measurably raise the pH of the meat without exceeding a pH of 6.8; whereby the cured meat product when cooked retains an increased amount of soluble protein and exhibits a larger cooked yield.

3. In a process of preparing a cooked, quick-cured ham wherein a fresh ham is quick-cured, the improvement which comprises treating a fresh ham with a meat-curing preparation containing a small amount of disodium phosphate, the amount of said disodium phosphate calculated on its anhydrous basis not exceeding about 5% by weight of said preparation, to increase the phosphate content of the ham expressed as disodium phosphate by not in excess of about 0.5% based on the weight of the cooked, quick-cured ham, and to measurably raise the pH of the ham without exceeding a pH of 6.8; whereby the quick-cured ham when cooked retains an increased amount of soluble protein and exhibits a larger cooked yield.

4. In a process of preparing cooked, cured meat products wherein a fresh meat is quick-cured, the improvement which comprises pumping a fresh meat with a meat-curing preparation containing a small amount of a weakly alkaline salt calculated on its anhydrous basis, said salt not exceeding about 5% by weight of said preparation, to measurably raise the pH of the meat without exceeding a pH of 6.8; whereby the cured meat product when cooked retains an increased amount of soluble protein and exhibits a larger cooked yield.

5. In a process of preparing cooked, cured meat products wherein a fresh meat is quick-cured, the improvement which comprises pumping a fresh meat with a meat-curing preparation containing a small amount of a dialkali phosphate calculated on its anhydrous basis, said dialkali phosphate not exceeding about 5% by weight of said preparation, to measurably raise the pH of the meat without exceeding a pH of 6.8; whereby the cured meat product when cooked retains an increased amount of soluble protein and exhibits a larger cooked yield.

6. In a process of preparing cooked, cured meat products wherein a fresh meat is quick-cured, the improvement which comprises pumping a fresh meat with a meat-curing preparation containing a small amount of disodium phosphate calculated on its anhydrous basis, said disodium phosphate not exceeding about 5% by weight of said preparation, to measurably raise the pH of the meat without exceeding a pH of 6.8; whereby the cured meat product when cooked retains an increased amount of soluble protein and exhibits a larger cooked yield.

7. In a process of preparing a cooked, quick-cured ham wherein a fresh ham is quick-cured, the improvement which comprises pumping a fresh ham with a meat-curing preparation containing a small amount of disodium phosphate calculated on its anhydrous basis, said disodium phosphate not exceeding about 5% by weight of said preparation, to measurably raise the pH of the ham without exceeding a pH of 6.8; whereby the quick-cured ham when cooked retains an increased amount of soluble protein and exhibits a larger cooked yield.

8. A meat curing preparation comprising sodium chloride, a soluble nitrite-forming salt, and a weakly alkaline salt, said weakly alkaline salt calculated on its anhydrous basis being present in a substantial amount not more than about 5% by weight of said preparation, whereby said preparation when applied to a fresh meat product will measurably raise the pH of the meat so treated without exceeding a pH of 6.8.

9. A meat curing preparation comprising sodium chloride, a soluble nitrite-forming salt, and a dialkali phosphate, said dialkali phosphate calculated on its anhydrous basis being present in a substantial amount not more than about 5% by weight of said preparation, whereby said preparation when applied to a fresh meat product will measurably raise the pH of the meat so treated without exceeding a pH of 6.8.

10. A meat curing preparation comprising sodium chloride, a soluble nitrite-forming salt, and disodium phosphate, said disodium phosphate calculated on its anhydrous basis being present in a substantial amount not more than about 5% by weight of said preparation, whereby said preparation when applied to a fresh meat product will measurably raise the pH of the meat so treated without exceeding a pH of 6.8.

GEORGE E. BRISSEY.

REFERENCES CITED

The following references are of record in the file of this patent:

UNITED STATES PATENTS

| Number | Name | Date |
|---|---|---|
| 439,144 | Greenstreet | Oct. 28, 1890 |
| 1,124,851 | Burkle | Jan. 12, 1915 |
| 2,117,478 | Hall | May 17, 1938 |
| 2,145,417 | Hall | Jan. 31, 1939 |

FOREIGN PATENTS

| Number | Country | Date |
|---|---|---|
| 24,306/29 | Australia | Dec. 17, 1930 |